United States Patent [19]

Haderer et al.

[11] Patent Number: 5,201,401
[45] Date of Patent: Apr. 13, 1993

[54] DISCHARGE CONVEYING APPARATUS FOR AN EXTRUSION PRESS

[75] Inventors: Kurt Haderer, Dusseldorf; Franz Schall, Dormagen, both of Fed. Rep. of Germany

[73] Assignee: SMS Hasenclever GmbH, Dusseldorf, Fed. Rep. of Germany

[21] Appl. No.: 908,925

[22] Filed: Jul. 2, 1992

Related U.S. Application Data

[63] Continuation of Ser. No. 607,039, Oct. 31, 1990, abandoned.

[30] Foreign Application Priority Data

Oct. 31, 1989 [DE] Fed. Rep. of Germany ....... 3936177

[51] Int. Cl.⁵ .............................................. B65G 47/34
[52] U.S. Cl. .................................. 198/463.3; 198/597; 198/809; 198/369
[58] Field of Search .................. 198/463.2, 463.3, 369, 198/372, 809, 457, 597, 607

[56] References Cited

U.S. PATENT DOCUMENTS

| 1,980,261 | 11/1934 | Fenton | 198/809 X |
|---|---|---|---|
| 2,681,130 | 6/1954 | Atwood | 198/463.3 |
| 3,104,004 | 9/1963 | Poel et al. | 198/457 X |
| 4,174,774 | 11/1979 | Bourgeois | 198/463.3 X |
| 4,256,222 | 3/1981 | Gunti | 198/597 X |
| 4,658,947 | 4/1987 | Welder | 198/463.3 X |
| 4,798,275 | 1/1989 | Leemkuil et al. | 198/809 X |
| 4,926,999 | 5/1990 | Fauth, Sr. et al. | 198/463.3 X |
| 4,962,841 | 10/1990 | Kloosterhouse | 198/809 X |

FOREIGN PATENT DOCUMENTS

| 1300898 | 6/1961 | Fed. Rep. of Germany . |
|---|---|---|
| 1452325 | 2/1964 | Fed. Rep. of Germany . |
| 2556894 | 12/1975 | Fed. Rep. of Germany . |
| 0067418 | 4/1982 | Japan ................. 198/463.3 |
| 0157120 | 7/1987 | Japan ................. 198/457 |
| 2175561 | 12/1986 | United Kingdom ............. 198/463.3 |

Primary Examiner—Robert P. Olszewski
Assistant Examiner—James R. Bidwell
Attorney, Agent, or Firm—Jacobson, Price, Holman & Stern

[57] ABSTRACT

In a horizontal extrusion press, a longitudinal discharge conveyor (2) comprises a plurality of short tandemly arranged longitudinal conveyor units (12), each comprising chains (18) and workpiece support beams (19,20), and a transverse conveyor (3) having stationary conveying elements (13) extending into spaces between the successive longitudinal conveyor units (12). The longitudinal conveyor units are raised and lowered relative to the transverse conveyor, in order to transfer extruded products from the longitudinal conveyor onto the transverse conveyor.

12 Claims, 3 Drawing Sheets

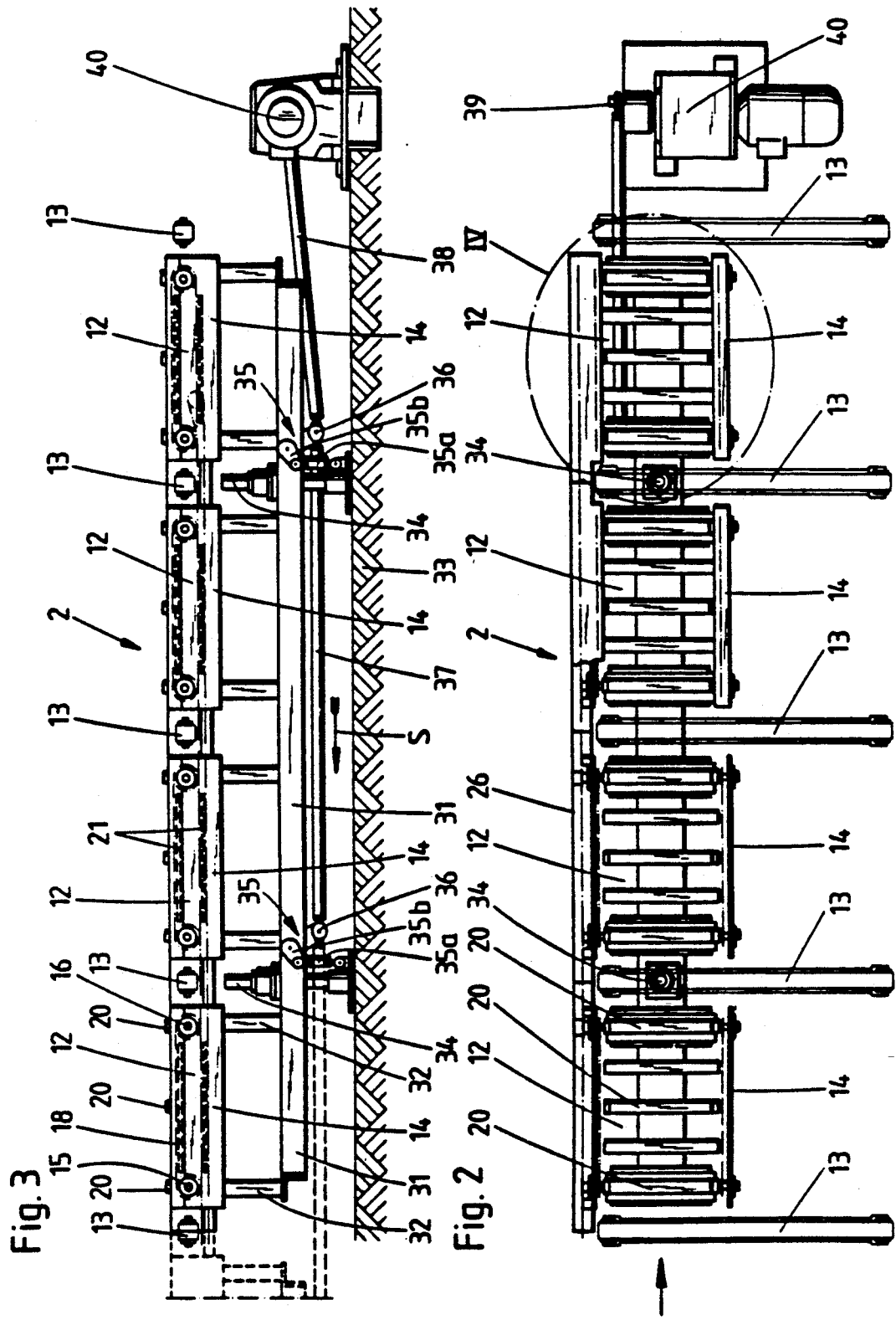

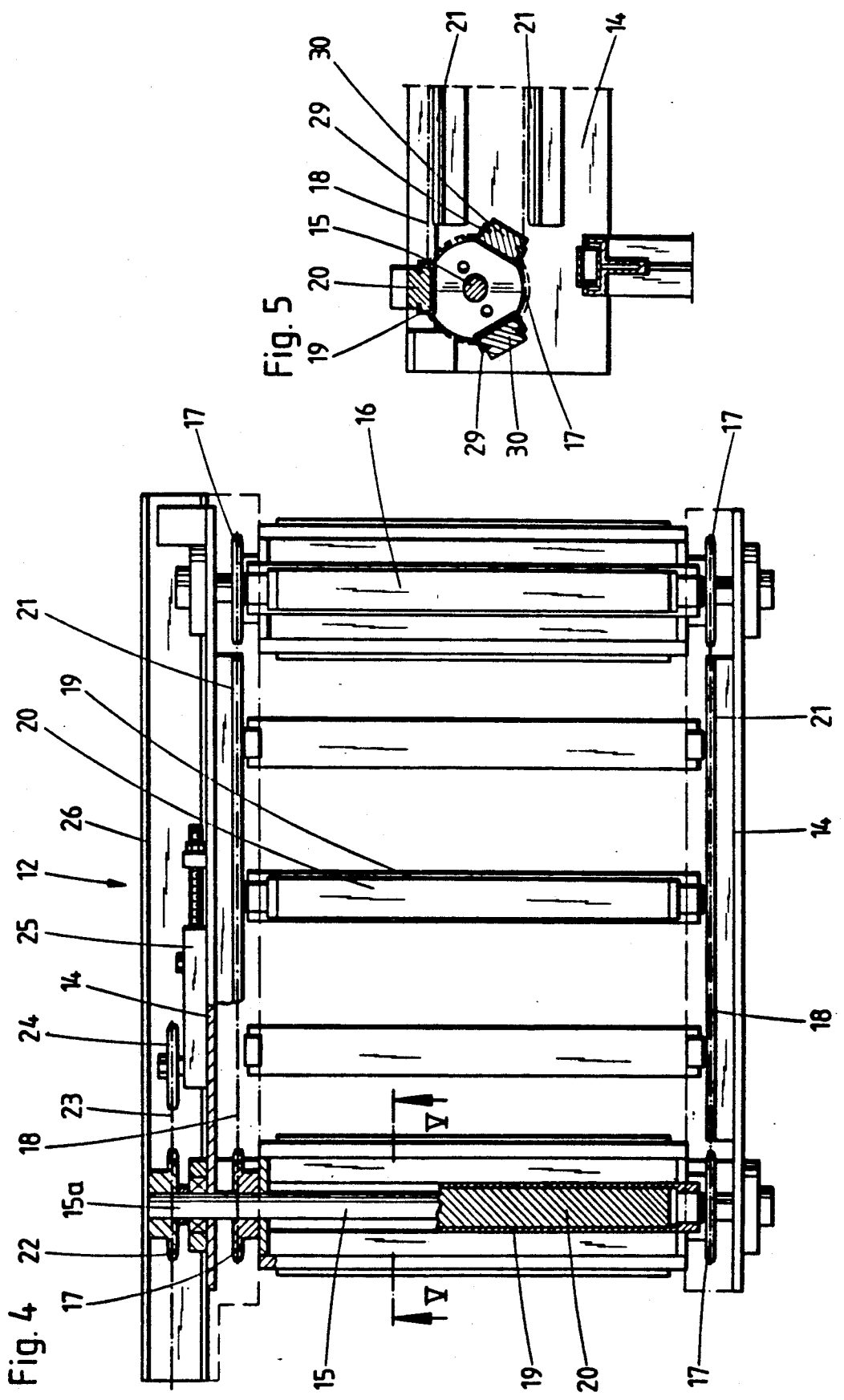

DISCHARGE CONVEYING APPARATUS FOR AN EXTRUSION PRESS

This is a continuation of application Ser. No. 07/607,039, filed Oct. 31, 1990 which was abandoned upon the filing hereof.

BACKGROUND OF THE INVENTION

This invention relates to discharge conveying apparatus for a longitudinal extrusion press. The discharge or exit conveying installations of extrusion presses have the task of conveying the extruded products or extrusions away lengthwise in the extrusion direction, i.e. the discharge or exit direction, and then conveying them crosswise in their entire length or in portions, to give the extrusions time to cool and, where appropriate, to convey them to a stretching bench as well as to devices for dividing them into commercial lengths and to stacking devices. Care must be taken to exert light tension on the extrusion so that it is held stretched straight, and for this purpose the longitudinal discharge conveyor is driven at a conveying speed which is somewhat greater than the extruding speed. There is thus no necessity for special drawing-out devices consisting of a carriage which can be moved lengthwise and which has gripping devices for the extrusion. The structural cost of such a drawing-out device cannot be balanced by a less expensive design of the longitudinal conveyor, but rather it becomes necessary to coordinate the longitudinal conveyor and What are known as beam conveyor belts are preferably provided as longitudinal conveyors. These beam conveyor belts are conveyors with parallel endless circulating chains arranged in pairs and with spaced beams connecting these, which beams are moved transversely by the chains in the discharge direction (Zeitschr. f. Metallkunde, vol. 60(1969) No. 3, p. 172 to 179; advertisement leaflet P2/1117, April 1970, Schloemann Aktiengesellschaft; W. German Patent 25 56 894). The beams offer the extrusions sufficient support to eliminate deformation of the extrusions, whilst scrape marks on the extrusions caused by the beams advancing slightly faster are avoided in that the beams themselves or supports on the beam consist of appropriate material. Supports made of graphite have proved particularly suitable. The span of the supported extrusions determines the spacing of the beams in the discharge direction, which spacing is sufficient in each case to make it possible for the extrusions to cool well. Moreover, the space between any two adjacent beams must be sufficient for the conveying elements of the transverse conveyor to be brought between the beams of the longitudinal conveyor and for the extrusions to be lifted up from the beams of the longitudinal conveyor by vertical relative movement and taken up by the transverse conveyor. This means that the longitudinal conveyor must be stopped for the entire time of entry, vertical relative movement and exit of the conveying elements of the transverse conveyor. Alternatively, stopping the longitudinal conveyor is not necessary if, during the time that they are engaged between the beams of the longitudinal conveyor, the conveying elements of the transverse conveyor can move with the longitudinal conveyor in the discharge direction and, after they have left the region of the beams again, are brought back to their starting position by springs or a piston-cylinder unit (West German Patent Specification 1 300 898). While the conveying elements of the transverse conveyor are brought back to their starting position, the extrusion and/or extrusion portion taken off by the conveying elements from the longitudinal conveyor must also be moved contrary to the discharge direction, which in turn can lead to damage to the extrusion or extrusion portion. Moreover, this device also has the disadvantage that, as a result of expansion, sag and play over the length of the longitudinal conveyor, more and more deviations in the chain pitch and thus in the beam pitch can occur, which deviations lead to the collision of beams of the longitudinal conveyor with conveying elements of the transverse conveyor.

It is an object of the invention to shorten the cycle time for the transfer of extrusions and/or extrusion portions from the longitudinal conveyor to the conveying elements of the transverse conveyor, and to eliminate collisions of the beams of the longitudinal conveyor and the conveying elements of the transverse conveyor.

SUMMARY OF THE INVENTION

According to the invention, the longitudinal conveyor is formed, depending on its length, from cooperating individual conveyors each of a length which corresponds to the space between adjacent conveying elements of the transverse conveyor, which elements remain in the conveying region of the longitudinal conveyor.

Although the forming of a longitudinal conveyor at the exit of an extrusion press from cooperating individual conveyors, depending on its length, in order to be able to drive the individual conveyors separately at different speeds, is known in principle (West German Patent Specification 14 52 325), transverse conveyors with their conveying elements are not provided in the region of these individual conveyors.

The invention maintains all the advantages of the "beam conveyors"; the conveying elements of the transverse conveyor remain permanently in the conveying region of the longitudinal conveyor, so that no time for entry and exit of these conveying elements into the conveying region of the longitudinal conveyor is needed and the cycle time for transfer becomes correspondingly shorter, and the longitudinal conveyor only needs to be stopped, and then only for a short time, when particularly sensitive extrusion shapes or materials are being transferred; any danger of collision between the longitudinal and transverse conveyors is eliminated.

Each individual conveyor is preferably constructed with a frame in which two shafts are mounted, each carrying a pair of chain wheels, and supporting rails are provided between the chain wheels for supporting the chains carrying the beams.

According to a further feature of the invention, the frames of the individual conveyors are combined, in groups or in their entirety, in base frames, and the individual conveyors are drivingly connected on the side facing away from the transverse conveyor by chain drives and chain wheels seated on the shafts which are extended to this side.

For the balancing of the vertical movement of the longitudinal conveyor or the transverse conveyor, which movement accompanies the vertical relative movement of longitudinal and transverse conveyors, it is advantageous to form the longitudinal conveyor so as to be raisable and lowerable, i.e. vertically movable, particularly since this formation also turns out to be structurally advantageous. In accordance with a further feature of the invention, the base frame is or the several base frames are therefore guided by columns in a vertical direction and, being provided with lifting means, can be lifted and lowered in relation to the conveying elements of the transverse conveyor which are arranged at a fixed height from the foundation. The invention therefore also provides that the base frame(s) is (are) offset by elbow levers in relation to the foundation in a vertical direction and the elbow levers are connected by a rod linkage to each other and to an eccentric drive.

As already mentioned, the spacing of the beams of the beam conveyor is determined by the support span, the free bending length of an overhanging extrusion always being smaller than the distance between the beams. As a result of the design of the longitudinal conveyor as plural individual conveyors in accordance with the invention, however, the overhanging extrusion loses its support as a beam dips away around a chain wheel, whereby the overhanging unsupported extrusion length can grow to almost double the size of the distance between the beams. In the case of extrusions having a cross-section which is small and/or has low resistance to bending, this can lead to sag of the extrusion tip to such an extent that the extrusion tip collides with the conveying elements of the transverse conveyor. Since a reduction of the beam spacing should be avoided, in accordance with another feature of the invention each shaft is equipped, between the chain wheels deflecting the chains, with one or more beams which are connected to and rotate with the shaft, and which, in cooperation in each case with one of the beams carried by the chains, form a star which gives the extrusions additional support, in such a way that the interposed beams form intermediate supports for the extrusion and in this way reduce the size of the free overhanging extrusion length accordingly.

BRIEF DESCRIPTION OF THE DRAWINGS

The invention will now be described in greater detail with reference to the accompanying drawings which show an embodiment of the invention by way of example only and wherein:

FIG. 2 is a top plan view on a larger scale of the segment of the view encircled at II in FIG. 1;

FIG. 3 is a side elevational view of the segment of the conveyor system shown in FIG. 2;

FIG. 4 is a further enlarged top plan view of the segment encircled at IV in FIG. 2; and FIG. 5 is a cross-sectional view taken along line V—V in FIG. 4.

DETAILED DESCRIPTION

Figure 1:
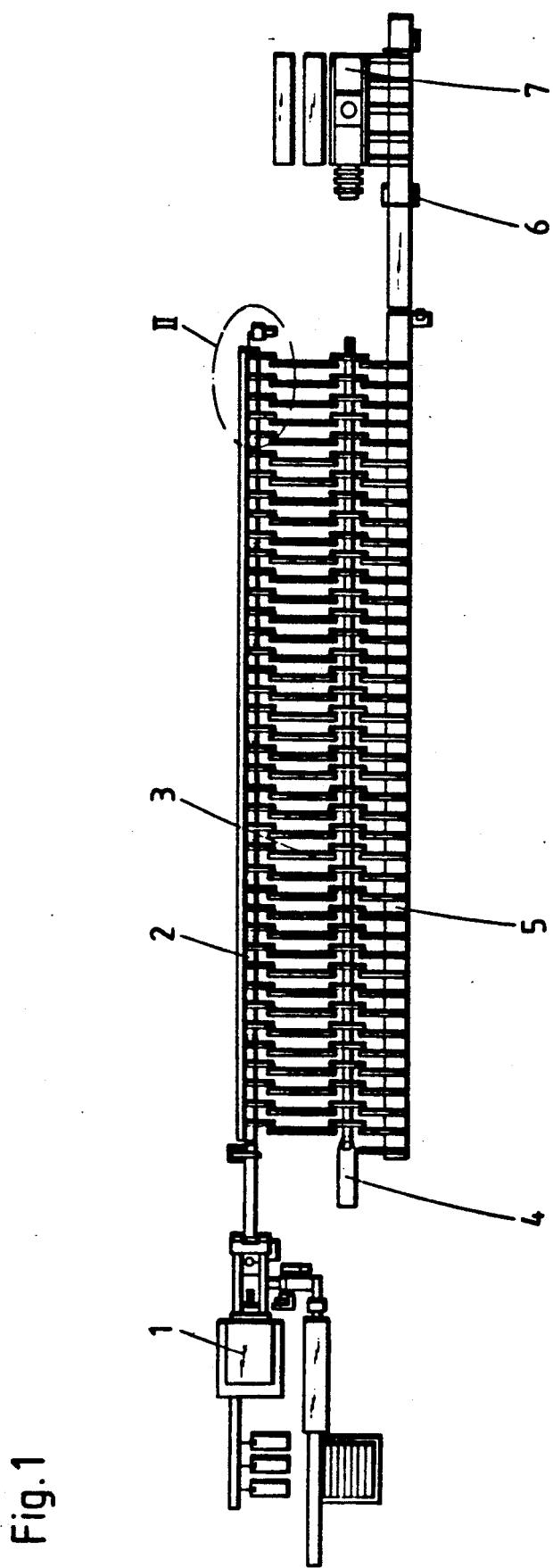
FIG. 1 is a schematic top plan view of an extrusion plant with longitudinal and transverse discharge conveyors and subsequent adjustment means in accordance with the invention.

The complete installation shown in FIG. 1 consists of an extrusion press 1 at whose exit a longitudinal conveyor 2 is arranged, with which conveying elements of a transverse conveyor 3 engage. The transverse conveyor 3 takes up the extrusions and/or portions of these extrusions, drawn out of the extrusion press 1 by the longitudinal conveyor 2, by vertical relative movement of the longitudinal conveyor 2 and transverse conveyor 3. During transverse conveyance, the extrusions and/or extrusion portions have sufficient time for cooling, which has already started on the longitudinal conveyor 2. A stretching bench 4 for the stretcher levelling of the extrusions and/or extrusion portions is integrated in the transverse conveyor 3. The extrusions and/or extrusion portions are delivered from the transverse conveyor 3 to a further longitudinal conveyor 5 which conveys them, collected in groups, to a saw or shears 6 which divides the extrusions into commercial lengths and conveys them to a stacking device 7.

As shown in FIGS. 2 and 3, the longitudinal conveyor 2 consists of a plurality of cooperating individual conveyors 12 arranged in tandem, each of which has a length which fills the gap between the conveying elements 13 of the transverse conveyor 3. Each individual conveyor 12 consists of a frame 14 in which two shafts 15 and 16 are mounted, each of which carries a pair of chain wheels 17. Two endless chains 18, arranged in pairs like the chain wheels 17, are guided by a chain wheel 17 on the shaft 15 and a chain wheel 17 on the shaft 16 respectively. These pairs of chains 18 carry holders 19 for inserts 20 of suitable material, in particular graphite. To support the flights of the chains 18, and thus the beams 19/20 formed from the holders 19 and inserts 20, the frames 14 are provided with slide rails 21. The shafts 15 are extended, on the side facing away from the transverse conveyor 3, and carry chain wheels 22 on their shaft stubs 15a projecting from the frame 14. An endless chain 23 is arranged along the frame 14, which chain is in engagement with the chain wheels 22 of the individual conveyors 12 and connects these in a driving manner. The chain 23 is therefore provided with a drive (not shown) and a chain tensioner 25 acting on one deflecting wheel 24 thereof. A cover 26 for the chain 23, the chain wheels 22, the chain drive, the deflecting wheel 24 and the chain tensioner 25 extends along the individual conveyors 12 and their frames 14.

The conveying elements 13 of the transverse conveyor 3 project between the adjacent ends of adjacent individual conveyors 12, in such a way that, by vertical relative movement between the conveying elements 13 and the individual conveyors 12, the extrusions and/or extrusion portions which have run onto the individual conveyors 12 can be taken up by the conveying elements 13 to be transported transversely on the transverse conveyor 3. For this purpose, either all the individual conveyors 12 are attached to one base frame 31, or groups (eight in the illustrated embodiment) of individual conveyors 12 (four per group in the illustrated embodiment) are attached to interconnected base frames 31 by supports 32. Columns 34 are attached to the foundation 33, which columns guide the base frame(s) 31 for movement in a vertical direction. The base frame is supported by elbow levers 35, of which one lever part 35a can be varied in length to align the base frame 31 and adjust the conveying plane of the longitudinal conveyor 2, formed by the upper edges of the beams 19/20, to the conveying plane of the conveying elements 13 of the transverse conveyor 3. The other lever part 35b is connected to a lever 36. The levers 36 are connected to each other by a rod linkage 37 and by a further rod linkage 38 to an eccentric 39 of a drive 40. By displacing the rod linkage 37 in the direction of the arrow S, the base frame 31 is lowered, in such a way that the extrusions and/or extrusion portions lying on the beams 19/20 are lowered into contact with the conveying elements 13 and can then be conveyed by these in a transverse direction. As soon as the extrusions and-/or extrusion portions have left the region of the longitudinal conveyor, the rod linkage 37 is moved contrary to the direction of the arrow S, in such a way that the longitudinal conveying plane formed by the beams 19/20 lies above that of the transverse conveying elements 13 and the longitudinal conveyor 2 is available for receiving a further extrusion and/or extrusion portion.

The conveying elements 13 of the transverse conveyor remain permanently in place between the successive individual conveyors 12 of the longitudinal conveyor, and in particular they do not move transversely relative to the longitudinal conveyor. The only relative movement of the longitudinal and transverse conveyors is the vertical relative movement involved in transferring extrusions from the longitudinal to the transverse conveyor. Thus, as already explained, the longitudinal conveyor can run essentially continuously, and the cycle time for transfer from the longitudinal to the transverse conveyor is no more than the time required for the vertical relative movement of the two conveyors.

At the transition from one individual conveyor 12 to another, in each of which transitions a conveying element 13 of the transverse conveyor 3 is placed, the spacing of the beams 19, 20 exceeds the normal spacing of the beams 19/20 along the pairs of chains 18 in that, as a result of a beam 19/20 dipping away with the chains 18 which run around the chain wheels 17 of a shaft 15, these beams 19/20 are not effective. To avoid, in these transition regions, knocking or grinding of the extrusions at or on the conveying elements 13 of the transverse conveyor, without having to choose a standard pitch of the beams 19/20 which is smaller than otherwise necessary, holders 29 for inserts 30, i.e. beams 29/30 evenly distributed with the beams 19/20 rotating with the chains 18, are mounted onto the shafts 15 and 16 between the chain wheels 17, and connected to the shafts 15 and/or 16. Instead of the two beams 29/30 in the embodiment in FIG. 5, a drum of appropriate external diameter with a cutout for the beams 19/20 rotating with the chains 18 could also be provided, although, for structural reasons, preference will generally be given to the solution shown in the drawing.

We claim:

1. In a conveying device arranged at the exit of an extrusion press, consisting of beams which are carried by closed rotating chains arranged in pairs and which are moved in the discharge direction of the extruded products to form a longitudinal conveyor, and a transverse conveyor engaging with said longitudinal conveyor for taking up the extruded products and/or portions thereof by vertical relative movement and formed from a plurality of spaced parallel-running conveying elements, the improvement wherein:

said longitudinal conveyor comprises, depending on its length, cooperating individual separate conveyors each having a length corresponding to the space between said conveying elements of said transverse conveyor, said conveying elements being stationary in the conveying region of said longitudinal conveyor.

2. A conveying device as claimed in claim 1, wherein:
said individual conveyors each comprises a frame, two shafts mounted on said frame, a pair of chain wheels on each shaft, and supporting rails between said chain wheel for said chains carrying the beams.

3. A conveying device as claimed in claim 2, wherein: said frames are combined in at least one group of individual conveyors by a base frame, and said individual conveyors are connected in a driving manner by chain drives on the side of each thereof facing away from said transverse conveyor and chain wheels seated on said shafts which are extended to said side.

4. A conveying device as claimed in claim 3, wherein:
said base frame of said at least one group is guided by columns in a vertical direction, and is provided with lifting means for raising and lowering in relation to said conveying elements of said transverse conveyor arranged at a fixed height from a foundation.

5. A conveying device as claimed in claim 4, wherein:
said base frame of said at least one group is supported by elbow levers in a vertical direction, and said elbow levers are connected by a rod linkage to each other and to an eccentric drive.

6. Discharge conveyor apparatus for a longitudinal extrusion press comprising a longitudinal conveyor disposed to receive an elongate extruded product from the extrusion press and to convey said product longitudinally and a transverse conveyor intersecting and extending transversely to said longitudinal conveyor and disposed to receive said extruded product from said longitudinal conveyor and to convey it from said longitudinal conveyor in a direction transverse to said longitudinal direction thereof, and wherein:

said transverse conveyor comprises a plurality of conveying elements spaced apart along and each extending transversely across said longitudinal conveyor; and said longitudinal conveyor comprises a plurality of separate individual conveyor units disposed in tandem with one another and each extending between adjacent conveying elements, each conveyor unit comprising
a plurality of parallel endless flexible chains
driving means for moving said flexible elements in a circulating path, and
a plurality of spaced beams extending transversely to and driven by said chains for carrying and conveying said products.

7. Conveyor apparatus as claimed in claim 6 and further comprising means for effecting relative vertical movement of said conveying elements and said conveyor units for transferring said products from said conveyor units onto said conveying elements.

8. A conveyor device as claimed in claim 6, wherein:
said individual conveyors each comprises a frame, two shafts mounted on said frame, a pair of chain wheels on each shaft, and supporting rails between said chain wheels for said chains carrying the beams.

9. A conveying device as claimed in claim 8, wherein:
said frames are combined in at least one group of individual conveyors by a base frame, and said individual conveyors are connected in a driving manner by chain drives on the side of each thereof facing away from said transverse conveyor and chain wheels seated on said shafts which are extended to said side.

10. A conveying device as claimed in claim 9, wherein:
said base frame of said at least one group is guided by columns in a vertical direction, and is provided with lifting means for raising and lowering said transverse conveyor in relation to said conveying elements arranged at a fixed height from a foundation.

11. A conveying device as claimed in claim 10, wherein:
said base frame of said at least one group is supported by elbow levers in a vertical direction, and said elbow levers are connected to a rod linkage to each other and to an eccentric drive.

12. In a conveying device arranged at the exit of an extrusion press, consisting of a longitudinal conveyor having beams carried by closed endless chains arranged in pairs and moved in the discharge direction of extruded products, and a transverse conveyor formed from a plurality of parallel running conveying elements and engaging with said longitudinal conveyor for taking up the extruded products and/or portions thereof by vertical relative movement, the improvement wherein:
said longitudinal conveyor is formed, depending on its length, from cooperating individual conveyors each having a length corresponding to the space between said conveying elements, said conveying elements remaining in the conveying region of the longitudinal conveyor;
said individual conveyors each comprises a frame, two shafts mounted on said frame, a pair of chain wheels mounted on each shaft, and supporting rails between said chain wheels for said chains carrying said beams; and
each shaft is provided, between said chain wheels driving said chains, with at least one second beam rotating with said shaft and forming in cooperation with one of said beams carried by said chains a star for supporting the extrusions.

* * * * *